(12) United States Patent
Mattar et al.

(10) Patent No.: US 11,679,334 B2
(45) Date of Patent: *Jun. 20, 2023

(54) DYNAMIC GAMEPLAY SESSION CONTENT GENERATION SYSTEM

(71) Applicant: Electronic Arts Inc., Redwood City, CA (US)

(72) Inventors: Mohamed Marwan Mattar, San Francisco, CA (US); Igor Borovikov, Foster City, CA (US)

(73) Assignee: ELECTRONIC ARTS INC., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/401,223

(22) Filed: Aug. 12, 2021

(65) Prior Publication Data

US 2022/0032202 A1   Feb. 3, 2022

Related U.S. Application Data

(63) Continuation of application No. 15/937,654, filed on Mar. 27, 2018, now Pat. No. 11,090,568.

(51) Int. Cl.
*A63F 13/63* (2014.01)
*A63F 13/86* (2014.01)
*A63F 13/213* (2014.01)
*A63F 13/215* (2014.01)
*A63F 13/44* (2014.01)
*A63F 13/35* (2014.01)

(52) U.S. Cl.
CPC ............ *A63F 13/86* (2014.09); *A63F 13/213* (2014.09); *A63F 13/215* (2014.09); *A63F 13/35* (2014.09); *A63F 13/44* (2014.09); *A63F 13/63* (2014.09); *A63F 2300/695* (2013.01)

(58) Field of Classification Search
CPC ................................. A63F 13/86; A63F 13/63
See application file for complete search history.

(56) References Cited

U.S. PATENT DOCUMENTS

| | | | |
|---|---|---|---|
| 6,010,405 A | 1/2000 | Morawiec | |
| 10,105,608 B1* | 10/2018 | George | A63F 13/211 |
| 11,090,568 B1 | 8/2021 | Mattar et al. | |
| 11,420,130 B2* | 8/2022 | Clingman | H04N 21/4722 |
| 11,442,987 B2* | 9/2022 | Clingman | A63F 13/86 |
| 2012/0028706 A1 | 2/2012 | Raitt et al. | |
| 2017/0289617 A1 | 10/2017 | Song et al. | |
| 2021/0046388 A1* | 2/2021 | Schwarz | H04N 21/8549 |
| 2021/0312301 A1* | 10/2021 | Azmandian | A63F 13/5375 |

* cited by examiner

*Primary Examiner* — David L Lewis
*Assistant Examiner* — Robert E Mosser
(74) *Attorney, Agent, or Firm* — Knobbe, Martens, Olson & Bear, LLP

(57) ABSTRACT

The present disclosure provides a system that automatically analyzes telemetric data, biometric data, and other data associated with a gameplay session to identify events occurring during the gameplay session. The telemetric data is generated by the game application during the gameplay session. The biometric data can be generated by input devices and can generate data associated with the user. The system can be configured to identify the segments associated with recorded gameplay events from the gameplay session and use the gameplay data associated with the events to create and output video data for a gameplay segment.

20 Claims, 7 Drawing Sheets

DYNAMIC GAMEPLAY SESSION CONTENT GENERATION SYSTEM

INCORPORATION BY REFERENCE TO ANY PRIORITY APPLICATIONS

Any and all applications for which a foreign or domestic priority claim is identified in the Application Data Sheet as filed with the present application are incorporated by reference under 37 CFR 1.57 and made a part of this specification.

BACKGROUND

Video game streaming and viewing of video games have become very popular. There are many individuals that stream content and create video game videos of their video game play sessions. These videos can be created by streamers and users using video creation tools. Creating gameplay videos can require expertise, specialized equipment, and take a significant amount of time.

SUMMARY OF EMBODIMENTS

The systems, methods, and devices of this disclosure each have several innovative aspects, no single one of which is solely responsible for the all of the desirable attributes disclosed herein.

In one embodiment, a computer-implemented method comprises: under control of one or more hardware computing devices configured with specific computer-executable instructions, the specific computer-executable instructions stored in an electronic hardware memory, receiving, over a network from a user computing system, gameplay session data from a gameplay session of a video game application on the user computing system, the gameplay session data including a plurality of events occurring during the gameplay session; identifying a subset of events of the plurality of events based at least in part on an analysis of at least a portion of the gameplay session data using an event identification model, wherein the gameplay session data is used as input for the event identification model; generating a digital storyboard including the subset of events; outputting instructions to provide the digital storyboard to a user within a storyboard editing interface; receiving input from the user indicating modifications to one or more of the subset of events; modifying the one or more events based on the client input resulting in one or more modified events; generating a virtual storyboard including at least the one or more modified events, wherein the virtual storyboard combines the one or more events into a digital storyboard output; outputting the digital storyboard output to the user.

In another embodiment, a system comprises: an electronic data store configured to store an event identification model; a hardware processor in communication with the electronic data store, the hardware processor configured to execute specific computer-executable instructions to at least: receive, over a network from a user computing system, gameplay session data from a gameplay session of a video game application on the user computing system, the gameplay session data including a plurality of events occurring during the gameplay session; identify a subset of events of the plurality of events based at least in part on an analysis of at least a portion of the gameplay session data using the event identification model, wherein the gameplay session data is used as input for the event identification model; generate a digital storyboard including the subset of events; output instructions to provide the digital storyboard to a user within a storyboard editing interface; receive input from the user indicating modifications to one or more of the subset of events; modify the one or more events based on the client input resulting in one or more modified events; generate a virtual storyboard including at least the one or more modified events, wherein the virtual storyboard combines the one or more events into a digital storyboard output; and output the digital storyboard output to the user.

In another embodiment a non-transitory computer-readable storage medium storing computer executable instructions that, when executed by one or more computing devices, configure the one or more computing devices to perform operations comprises: under control of one or more hardware computing devices configured with specific computer-executable instructions, the specific computer-executable instructions stored in an electronic hardware memory, receiving, over a network from a user computing system, gameplay session data from a gameplay session of a video game application on the user computing system, the gameplay session data including a plurality of events occurring during the gameplay session; identifying a subset of events of the plurality of events based at least in part on an analysis of at least a portion of the gameplay session data using an event identification model, wherein the gameplay session data is used as input for the event identification model; generating a digital storyboard including the subset of events; outputting instructions to provide the digital storyboard to a user within a storyboard editing interface; receiving input from the user indicating modifications to one or more of the subset of events; modifying the one or more events based on the client input resulting in one or more modified events; generating a virtual storyboard including at least the one or more modified events, wherein the virtual storyboard combines the one or more events into a digital storyboard output; outputting the digital storyboard output to the user.

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

DETAILED DESCRIPTION OF EMBODIMENTS

Overview

Figure 1:
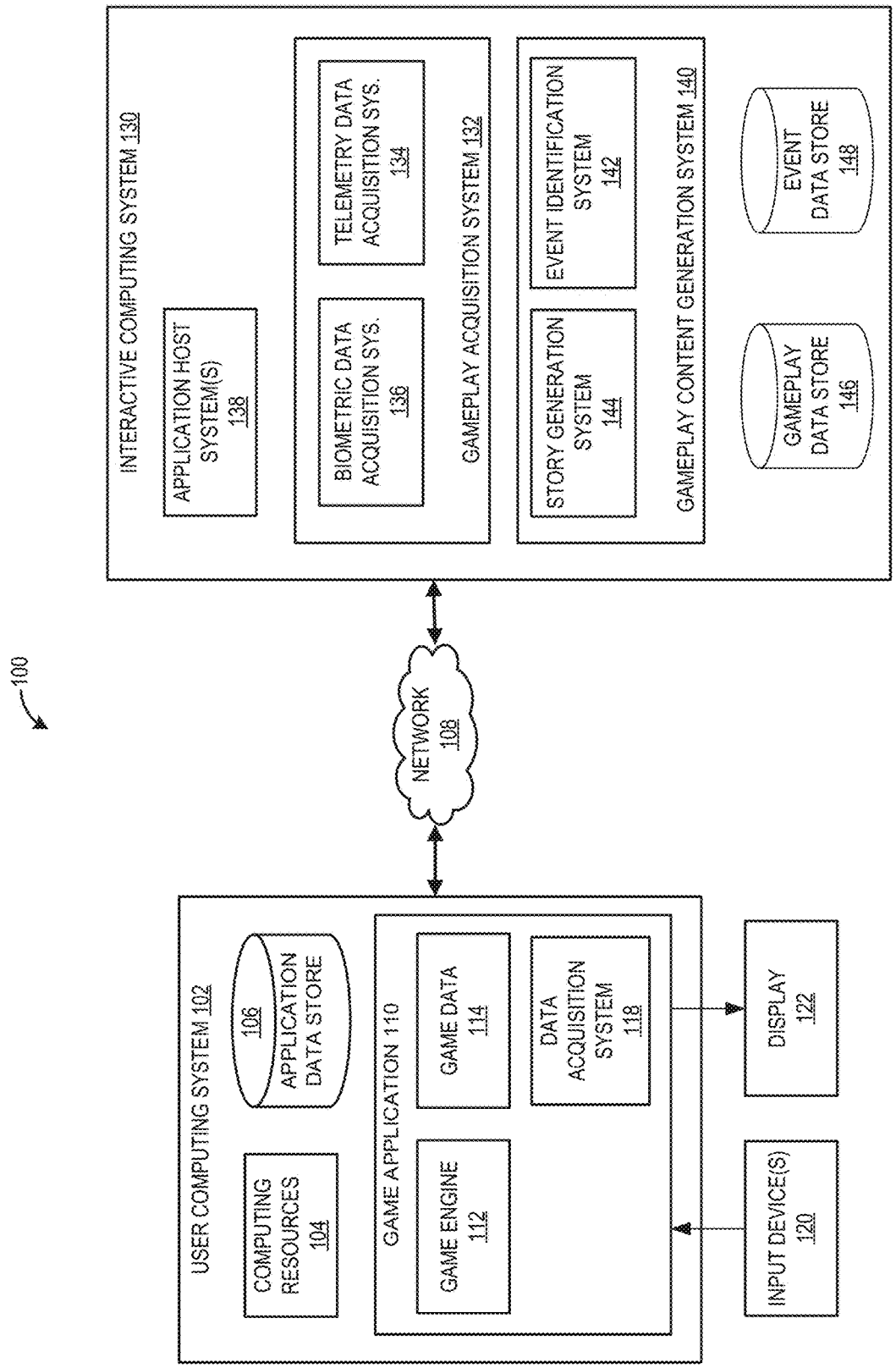
FIG. 1 illustrates an embodiment of a networked computing environment that can implement one or more embodiments of a gameplay content generation system.

As discussed above, users enjoy creating gameplay videos from their gameplay sessions. Each gameplay session may have interesting or noteworthy events that a user would like to share, such as completing a portion of the game, earning a significant achievement, defeating a specific enemy, or performing another feat or event within the game. However, many times a single gameplay session can extend for multiple hours. A gameplay session may include long stretches of time where players are performing actions that are not significantly engaging to interesting to watch for other users. The user may not know where exactly when specific events occurred during the gameplay session. The user will generally have to spend a significant amount of time rewatching and editing the gameplay session in order to create an engaging gameplay video from a gaming session. Accordingly, it would be beneficial for the system to not only record the gameplay session but to automatically index specific events within the gameplay video and generate content for the user that is representative of the interesting segments of gameplay.

One solution to this problem is to provide a system that automatically analyzes telemetric data, biometric data, and other data associated with a gameplay session to identify events occurring during the gameplay session. The system can automatically categorize and index events of the gameplay session. The system can automatically identify portions of the gameplay session that include interesting events that the users performed or occurred during the gameplay session. The system can be configured to use different types of data associated with the gameplay session to identify interesting events within the gameplay session.

During a gameplay session, the system can generate different types of gameplay session data, such as telemetric data and biometric data. The telemetric data is generated by the game application during the gameplay session. The biometric data can be generated by input devices and can generate data associated with the user, such as audio data received from a microphone, a video data received from a camera, motion data received from sensors within a controller, and/or other types of data associated with the user during the gameplay session.

The gameplay session data provides the telemetric and biometric data. The telemetric data can provide all the state and event data for the gameplay session. The biometric data can determine when the user is excited or had a reaction to the video. The telemetric data and the biometric data are intrinsic data from a gameplay session. These intrinsic data points are used as inputs by an event identification model to identify interesting events that occurred during the gameplay session.

The event identification system analyzes gameplay session data and can identify interesting events. The event identification system can use various processes, algorithms, heuristics, and/or machine learning models, that are generated and implemented based on gameplay session data, external data, and/or feedback data. External data can refer to data that is obtained from sources external to a gameplay session, such as social media data. The external data can be used by the event identification system to identify events of significance within a gameplay session. The external data can be based on information obtained for social media sites or streaming sites. These sites can be curated to identify information associated with game applications that may be interesting. For example, the sites can identify events that are trending, such as glitches, important achievements, challenges, types of events users enjoy watching, or other events occurring in video games that are garnering public approval or disapproval. These events may not be automatically detected or may not necessarily be apparent from gameplay session data as being events of significance. The system can use various methods for acquiring external data. For example, during a live gameplay stream of a video game on a social media site, the number of comments that are occurring during a particular segment, the number of subscribers, audio data and video data associated with the streamer, and other data associated with the stream can be provided to the machine learning model to generate the event identification model. The function of the event identification system is to identify events within a gameplay session that would be interesting to a viewer to see after the gameplay session is concluded.

The system can include a gameplay output generation system that generates a gameplay session storyboard. The storyboard can be automatically populated with events identified by the event identification system. The storyboard generation system can automatically select the events and provide an interface for the user to view the selected events for the storyboard. The storyboard can then be configured by the user to create a an storyboard in the form of a video, a scrolling automated document, such as a comic book, a series of short videos associated with each identified event, or other visual story board. The storyboard generation system can automatically select all the events based on the settings of the game application and/or user. After the segments are selected automatically or semi-automatically with additional input from the user, the system can generate a dynamic storyboard for outputting by the user.

The storyboard generation system can generate segments for each identified event from the gameplay session. The storyboard generation system can be configured to identify the segments associated with recorded gameplay events from the gameplay session and use state data associated with the events to create videos for a segment within the storyboard. Videos or images of segments within the storyboard can be from a different perspective that the user's perspective when the event occurred within the gameplay session. For example, in a first person shooter (FPS), the view can be largely the same, either first person view or over the shoulder. During a replay of an event it can be more engaging to see the events from a different angle. The storyboard generation system can use state information from a specific event to recreate the view of a boss battle from a different angle or perspective that would be more engaging from the user to view.

In addition to manipulating the view that a user sees during the gameplay session, the storyboard generation system can automatically reduce the length of segments for an event, such as capturing the most important parts of a segment. In some instances, a video segment can be converted to a series of still images. A user may wish to create a story board of the events that are all still images of the video game session, similar to a comic book. The images can be generated and placed into a series of gameplay session chapters. For example, in a long role-playing game the user may wish to chronicle the adventure and generate a comic book of the adventure after each gameplay session.

The storyboard generation system can be configured to post process the graphics within the game to give them a different appearance, for example the graphics can be post processed to provide a more a different style of art, such as reducing the resolution of the textures and adding thicker lines at the edges of entities within a frame, and/or other types stylistic effects or modifications to the frames within a video or image. These effects can be applied using filters or other post processing effects. The storyboard generation system can add annotations to the videos and/or images can be added based on the events. For example, during an explosion within in the game, the resulting images can have automated annotations associated with the type of event, such as "BOOM!".

After the user creates the storyboard, the user can receive a copy of the storyboard or a link to the storyboard. The storyboard can be shared by the user so that it can be viewed by other users on social media sites. For example, the storyboard generation system may be configured to output in formats that can be uploaded directly to social media sites like Instagram, twitter, vine, Facebook, snapchat and the like. These outputs can be saved in a user account. The output may also include ways for the storyboards to be tracked on certain sites so that feedback related to the events can be tracked. The feedback can be tracked and used to provide an ongoing loop of feedback to retrain the event identification system. The feedback can help identify events, and provide feedback on the storyboard content itself, such as visual post processing effects, types of views that are best received, recommendations for annotations, length of the storyboards and other aspects of the system that can be determined based on feedback.

Further, as described herein, the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

Various aspects of the novel systems, apparatuses, and methods are described more fully hereinafter with reference to the accompanying drawings. Aspects of this disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the novel systems, apparatuses, and methods disclosed herein, whether implemented independently of or combined with any other aspect. For example, an apparatus may be implemented or a method may be practiced using any number of the aspects set forth herein. In addition, the scope is intended to encompass such an apparatus or method which is practiced using other structure, functionality, or structure and functionality in addition to or other than the various aspects set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to any systems and/or devices that could benefit from universal facial expression. The detailed description and drawings are merely illustrative of the disclosure rather than limiting, the scope of the disclosure being defined by the appended claims and equivalents thereof.

In various embodiments, systems and/or computer systems are disclosed that comprise computer readable storage media having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising computer readable storage media are disclosed, wherein the computer readable storage media have program instructions embodied therewith, the program instructions executable by one or more processors to cause the one or more processors to perform operations comprising one or more aspects of the above- and/or below-described embodiments (including one or more aspects of the appended claims).

As used herein in reference to user interactions with data displayed by a computing system, "user input" is a broad term that refers to any type of input provided by a user that is intended to be received and/or stored by a system, to cause an update to data that is displayed by the system, and/or to cause an update to the way that data is displayed by the system. Non-limiting examples of such user input include keyboard inputs, mouse inputs, digital pen inputs, voice inputs, finger touch inputs (e.g., via touch sensitive display), gesture inputs (e.g., hand movements, finger movements, arm movements, movements of any other appendage, and/or body movements), and/or the like. Additionally, user inputs to the system may include inputs via tools and/or other objects manipulated by the user. For example, the user may move an object, such as a tool, stylus, or wand, to provide inputs. Further, user inputs may include motion, position, rotation, angle, alignment, orientation, configuration (e.g., fist, hand flat, one finger extended, etc.), and/or the like. For example, user inputs may comprise a position, orientation, and/or motion of a hand and/or a 3D mouse. User input may optionally be provided to a user device utilized by a user, and the user device may provide the user input to a system (e.g., the stream optimization system 100) for processing.

As used herein, a data store can refer to any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

As used herein, a database can refer to any data structure (and/or combinations of multiple data structures) for storing and/or organizing data, including, but not limited to, relational databases (e.g., Oracle databases, mySQL databases, and so on), non-relational databases (e.g., NoSQL databases, and so on), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores.

Overview of Video Game Environment

FIG. 1 illustrates an embodiment of a computing environment 100 for implementing a storyboard generation system 140. The environment 100 includes a network 108, a user computing system 102, and an interactive computing system 130. To simplify discussion and not to limit the present disclosure, FIG. 1 illustrates only a user computing system 102 and one interactive computing system 130, though multiple systems may be used.

The interactive computing system 130 can include one or more application host systems 138, one or more telemetry data stores 146, one or more event data stores 148, and a gameplay acquisition system 132. The gameplay acquisition system 132 can communicate with data stores 146, 148 and/or with the application host systems 138 to acquire data associated with a game application.

The gameplay acquisition system 132 can communicate with user computing system 102 through the network 108. Although only one network 108 is illustrated, multiple distinct and/or distributed networks 108 may exist. The network 108 can include any type of communication network. For example, the network 108 can include one or more of a wide area network (WAN), a local area network (LAN), a cellular network, an ad hoc network, a satellite network, a wired network, a wireless network, and so forth. In some embodiments, the network 108 can include the Internet.

The user computing system 102 can be controlled by a user. The user computing system 102 can be used to acquire data of the game application 110 during gameplay sessions. The data acquisition system 118 of the user computing system 102 can capture data associated with a gameplay session of the game application 110.

For purposes of the present disclosure, the term "player" or "player system" can refer to a game application that is being operated by a person during a gameplay session. For example, the user computing system 102 can refer to the computing system operated by the player providing gameplay session data to the interactive computing system 130 through the data acquisition system 118.

A. Interactive Computing System

In the illustrated embodiment, the interactive computing system 130 includes one or more application host systems 138, one or more telemetry data stores 146, one or more event data stores 148, a gameplay acquisition system 132, and a storyboard generation system 140. These systems may communicate with each other. For example, the gameplay acquisition system 132 can obtain data associated with a game application from the application host systems 138 and can store such data in the telemetry data store 146.

1. Application Host Systems

The application host systems 138 can be configured to execute a portion of the game application 110. In certain embodiments, the application host systems 138 may execute another application instead of or in addition to executing a portion of the game application 110, which may complement and/or interact with the game application 110 during execution of a gameplay session of the game application 110.

The interactive computing system 130 may enable multiple players or computing systems to access a portion of the game application 110. In some embodiments, the portion of the game application 110 executed by application host systems 138 of the interactive computing system 130 may create a persistent virtual world. This persistent virtual world may enable one or more players to interact with the virtual world and with each other in a synchronous and/or asynchronous manner. In some cases, multiple instances of the persistent virtual world may be created or hosted by the interactive computing system 130. A set of players may be assigned to or may access one instance of the persistent virtual world while another set of players may be assigned to or may access another instance of the persistent virtual world. In some embodiments, the application host systems 138 may execute a hosting system for executing various aspects of a game environment. For example, in one embodiment, the game application 110 may be a competitive game, such as a first person shooter or sports game, and the host application system 138 can provide a dedicated hosting service for hosting multiplayer game instances or facilitate the creation of game instances hosted by player computing devices. In some embodiments, the application host systems 138 can provide a lobby or other environment for players to virtually interact with one another.

2. Gameplay Acquisition System

As described with respect to other systems in FIG. 1, the gameplay acquisition system 132 can communicate with other systems to acquire data associated with a game application and to analyze the data. The gameplay acquisition system 132 can include one or more systems for data acquisition and analysis. For example, the gameplay acquisition system 132 can include a biometric data acquisition system 136 and a telemetry data acquisition system 134. These example systems are not intended to be limiting, and the gameplay acquisition system 132 may include fewer or more systems than described. In some embodiments, the gameplay acquisition system 132 may include more systems and/or functionalities that facilitate the acquisition of game data and the analysis of a game application.

The gameplay acquisition system 132 and its various systems may be distributed across multiple computing systems. The various systems of the gameplay acquisition system 132 can communicate with each other to obtain and analyze data associated with a game application. For example, a portion of the telemetry data acquisition system 134 may be executed by the user computing system 102, while another portion of the telemetry data acquisition system 134 may be executed by the interactive computing system 130. The telemetry data acquisition system 134 of the gameplay acquisition system 132 may communicate with the data acquisition system 118 of the user computing system 102 to acquire video data. The telemetry data acquisition system 134 of the interactive computing system 130 may generate a session ID for a particular game session. The telemetry data acquisition system 134 of the user computing system 102 may be a plug-in to the game application 110 and acquire video data of the game's execution. In some embodiments, the telemetry data acquisition system 134 may be entirely implemented by the user computing system 102. In some embodiments, the computing device may have a video acquisition system that is independent of the gameplay acquisition system 132 and the game application. For example, a game console may acquire gameplay videos. Some example interactions between various systems of the gameplay acquisition system 132 are further illustrated in FIG. 2. Each system of the gameplay acquisition system 132 is described in more detail below.

The gameplay acquisition system 132 can be configured to coordinate and synchronize the capture of biometric data and telemetry data associated with gameplay sessions. For example, the biometric data and telemetry data can have the same session ID and can have synchronized timestamps associated with the captured data.

a. Telemetry Data Acquisition System

Telemetry data acquisition system 134 can be configured to acquire telemetry data during a gameplay session. Telemetry data of a game application can be used to identify events that occur during the gameplay session. The telemetry data acquisition system 134 can be configured to record defined events that are triggered during the gameplay session. Telemetry data may include data specific to the game application such as, for example, character's movements, character's positions, character actions (for example, firing a gun, shooting a basketball, and the like), in-game event (for example, an enemy's death, the start of a play, a point being scored), player inputs (for example, buttons pressed), in-game camera position, character dialogue, and the like. The telemetry data may also define one or more segments within a game application. A segment can define a start time and an end time. A segment can include all events that trigger within the start time and the end time. For example, in a football game, the segments may include individual plays and quarters.

In some embodiments, the telemetry data acquisition system 134 may also acquire system information associated with operation of the game application. The system information may include performance data such as, frame rate, CPU or memory utilization rate, machine on which the game application is executed, and the like.

The telemetry data acquisition system 134 can record execution of a gameplay session of the game application 110. The telemetry data acquisition system 134 can record the video data and audio data output by the video game application as one or more data streams. For example, the telemetry data acquisition system 134 may gather video data such as, for example, moving visual images of the gameplay (for example, object's movements), audio data (for example, sound of bombing or shooting), system notifications, dialogues, interactions with items, messages among the players, player commentary, web cam footage or the like. The telemetry data acquisition system 134 can record the screen of the user computing system 102 during a gameplay session. In some embodiments, the telemetry data acquisition system 134 may be configured to acquire video data associated with multiple views of a gameplay session. For example, a game application may record a plurality of video capture streams within a gameplay session even though only a single view is displayed on the user computing system at a given time.

The telemetry data acquisition system 134 can be configured to interface with different types of user computing systems. Each type of gaming console and operating system can have different types of interfaces that are used to record a gameplay session. In some embodiments, the console may already include video recording software that can record the gameplay session and provide it to the telemetry data acquisition system 134. In some embodiments, the telemetry data acquisition system 134 can generate instances, such a virtual machine instance, for each player computer system that are responsible for interfacing with the user computing system and retrieving the gameplay session. In some embodiments, video and audio data may be acquired by separate software and/or hardware.

In some embodiments, the data acquired by the telemetry data acquisition system 134 may be streamed live to the interactive computing system 130 and stored in temporary storage prior to analysis and encoding by the telemetry data acquisition system 134. For example, the data acquisition system 118 may gather video data and transmit the video data to the telemetry data acquisition system 134. The telemetry data acquisition system 134 may record the gameplay session, store the recorded video, such as in telemetry data store 146, and transmit the recorded data to other computing systems at a later time.

As described with reference to telemetry data acquisition system, the video data may be linked to a gameplay session based on the session ID. During the gameplay session, the video data acquired by the telemetry data acquisition system 134 may be associated with a start timestamp and/or an end timestamp. The start timestamp can be an absolute value based on the time that the gameplay session was initiated (such as, 8:30:00.05 am). Each timestamp recorded during the gameplay session can also be based on the absolute time. For example, the end timestamp may be 8:31:00.43 am. In some embodiments, timestamps may be generated and/or expressed that are relative to the start timestamp of the video. For example, a one minute video of the gameplay session may have the timestamps between 0 seconds and 60 seconds.

In between the start timestamp and end timestamp, the video data may be divided into a plurality of frames. The timestamps may be used to refer to specific frames within the video. In some embodiments, the gameplay acquisition system 132 can associate an event with certain timestamps of the video data. The event can further be associated with other data, such as telemetry data, in the gameplay session using the session ID and timestamps. For example, the gameplay acquisition system 132 may record a shooting game application in a gameplay session. During a shooting game, an event may trigger be when a player shoots a weapon. The gameplay acquisition system 132 can identify the timestamp when this event occurs. The gameplay acquisition system 132 can associate video frames and telemetry data for this event based on the timestamps.

Telemetry data acquisition system 134 may associate telemetry data acquired during a gameplay session with the session ID. The telemetry data can be associated with the biometric data using the session ID.

b. Biometric Data Acquisition System

The biometric data acquisition system 136 can be configured to acquire biometric data during a gameplay session. The biometric data can be generated by input devices and can generate data associated with the player during the gameplay session. The biometric data can include audio data received from a microphone, a video data received from a camera, motion data received from sensors within a controller, and/or other types of data associated with the player during the gameplay session. In some embodiments, the camera may be configured to provide multiple streams of data associated with the gameplay session. For example, the camera may provide video data, depth data, and/or audio data. The depth data can be configured to provide a distance from the camera to objects within the frame. The biometric data can be used to capture actions of the player during the gameplay session. For example, the biometric data can capture reactions to certain events, such as excitement, yelling, stress, frustration or other emotions expressed by the player. The biometric data can be used to by the event identification system to identify events within the game where the player was most engaged. The biometric data can be a separate data stream from the telemetric data stream. Additionally, each biometric input device can have a separate stream and/or interface for communicating the data to the biometric data acquisition system 136.

B. Gameplay Output Generation System a. Event Identification System

The event identification system 142 is configured to identify events within gameplay sessions. The event identification system can generate event identification models using machine learning algorithms. The event identification model can be generated as described herein with reference to FIG. 4. In some embodiments, the event identification system 146 can use the gameplay data, external data, and feedback data to identify events using direct methods and/or heuristics. For example, the event identification system 146 can use direct information-value measures (for example, computing the relative entropy of the fragments of the stream and find spikes) to identify an event. Other methods, processes, and/or algorithms can also be used. The event identification system is configured to identify events within a gameplay session that are important and relevant to the player during the gameplay session. The input data for a gameplay session can include the gameplay session data acquired by the GAS. The gameplay session data generated during the gameplay session can include telemetric data that is gathered by the telemetric data acquisition system and biometric data gathered by the biometric data acquisition system. The biometric data can include audio data, such as captured from a microphone, video data, sensors data from a controller, such as movement data, such as when the user is shaking or moving the controller.

The gameplay session data can be provided as input to the event identification system. The event identification system can use the input data to determine events that would be significant or interesting to the player. The event identification system can determine how to identify events using gameplay data, external data, and/or feedback data. The event identification system can analyze the data and identify events within the gameplay session. The event identification system may provide a rating associated with each of the events. For example, the event identification system may analyze each event within the gameplay session and provide a rating for that event, only events that satisfy a rating threshold are output for use by the storyboard generation system. The event identification system may only analyze a subset of the total events that occur during a gameplay session, for example, the event identification model may be configured to analyze events that are associated within a defined category or set of categories.

The event identification system may be configured to determine a time stamp or time frame associated with an event. Each identified event may have a start time and an end time. The event identification system may identify biometric data that is relevant to an identified event. For example, if a player was extremely excited after completing an event, the biometric data may include audio or video data that displays the user's excitement. The biometric data could be identified as being relevant for potentially including within the generation of the storyboard. The event data can be stored in the event data store 148, which may be a subset of the total gameplay session data associated with a gameplay session.

b. Digital Storyboard Generation System

The digital storyboard generation system 144 is configured to generate a storyboard based on the events that have been selected by the event identification system. The event identification system can output the event selection to the storyboard generation system to generate a storyboard. The storyboard can also receive state data associated with each identified event, so that the system can have access to additional information associated with each identified event. Depending on the settings of the specific game application, the storyboard generation system can be configured to identify how the events are to be displayed within the storyboard. The storyboard can have a variety of different formats, such as a video a flipbook, a comic book, or other format. The format, layout, and other design parameters or characteristics can be defined by the storyboard generation system, the game application, and/or the player.

After the format of the storyboard has been determined, the storyboard generation system can be configured to determine how to generate each event for display within the storyboard. Depending on the type of game application and the events selected, each event can have certain display parameters that can be modified by the storyboard generation system and/or the player. The storyboard generation system may be configured to provide the event in its raw format, in other words, the format in which it was viewed by the player during the gameplay session. However, the raw format may not be as appealing or as engaging as seeing the event in another format. For example, in a long fight, the entire fight may not be engaging, but the storyboard generation system may splice together a series of frames of each or a subset of the hits on the boss and the killing blow into a time-lapse type video of the event, rather than displaying the entire fight sequence.

The storyboard generation system can use state information from the gameplay to provide different camera angles that provide a different perspective of the fight that was not viewed by the player while playing thought specific event. The storyboard generation system can also modify the graphics that were generated during the event. The storyboard generation system may adapt to the graphics to a selected style of the storyboard. For example, a storyboard may have a comic book style, and the event can be configured to alter each of the events to emulate more closely comic book art. The storyboard generation system may be configured to additionally automatically add annotations to events (for example, BOOM!, CRASH, and the like) based on the type of event that occurs.

In some embodiments, the storyboard generation system may use machine learning models to determine how to modify the output of events that are preferred by users. For each event, the storyboard generation system may be configured to automatically perform the various modifications to the presentation of the events based on the storyboard configuration settings, user preference settings, social media data, and other types of inputs.

The storyboard generation system can be configured to provide a user interface for the storyboard creation that can allow for the user to select subset of the total events identified and can provide preferences for how each of the events can be post processed and modified. In providing these selections, the system can receive feedback from the player. The selections can help identify interesting events and the type of modifications that a player prefers. The feedback information from the players can be fed back into the event identification models in order to continuously update the models.

In some embodiments, the storyboard generation system can automatically generate the entire storyboard based on predefined setting s or characteristics, such characteristics may be determined by the storyboard generation system, the player, and/or the game application.

The system can generate an output for the user based on the generated storyboard. The generated storyboard can be output in multiple digital formats, for example it can be output as a link to a web service that allows for users to visit the website and view the generated storyboard. The output can also be a file that can be output on various social media platforms, which can then be accessed by other users viewing those platforms.

3. Data Stores

The interactive computing system 130 can include a gameplay data store 146 and an event data store 148. The data stores can be configured to store data acquired by other systems, such as, for example, telemetry data, video data, user data, event data, or the like. The data store may be distributed across multiple computing devices (see for example computing device in FIG. 6). In some embodiments, the data stores may be network-based storage system where data may be stored in different locations.

C. User Computing System

The user computing system 102 may include hardware and software components for establishing communications over a communication network 108. For example, the user computing system 102 may be equipped with networking equipment and network software applications (for example, a web browser) that facilitates communications via one or more networks (for example, the Internet or an intranet). The user computing system 102 may have varied local computing resources 104, such as, central processing units and architectures, memory, mass storage, graphics processing units, communication network availability and bandwidth, and so forth. Further, the user computing system 102 may include any type of computing system. For example, the user computing system 102 may include any type of computing device(s), such as desktops, laptops, game application platforms, virtual reality systems, augmented reality systems, television set-top boxes, televisions (for example, Internet TVs), network-enabled kiosks, car-console devices computerized appliances, wearable devices (for example, smart watches and glasses with computing functionality), and wireless mobile devices (for example, smart phones, PDAs, tablets, or the like), to name a few. In some embodiments, the user computing system 102 may include one or more of the embodiments described below with respect to FIG. 6.

1. Game Application

The user computing system 102 is capable of executing a game application 110, which may be stored and/or executed locally and/or in a distributed environment. In a locally executed game application 110, generally, the game does not rely or utilize an external computing system (for example, the interactive computing system 130) to execute the game application. In some instances, a locally executable game can communicate with an external server to retrieve information associated with the game, such as game patches, game authentication, clouds saves, or other features. In distributed game applications, the user computing system 102 may execute a portion of a game and the interactive computing system 130, or an application host system 138 of the interactive computing system 130 may execute another portion of the game. For instance, the game may be a massively multiplayer online role-playing game (MMORPG) that includes a client portion executed by the user computing system 102 and a server portion executed by one or more application host systems 138. For the present discussion, the type of game application 110 can be a locally executable game, a distributed application, or an application that includes a portion that executes on the user computing system 102 and a portion that executes on at least one of the application host systems 138. The user computing system can include various input devices 120 that can be used to capture player input for use during execution of a video game application. The game application can be configured to generate instructions to the computing resources to output execution of the game application 110 on the display 122.

2. Data Acquisition System

Data acquisition system 118 may be used to acquire data associated with a player and/or game application 110. Data acquisition system 118 can interface with the system of the interactive computing system such as the telemetry data acquisition system 134 and biometric data acquisition system 136 in order to transfer data during gameplay sessions. The data acquisition system 150 can acquire telemetry data of a game application (using telemetry data acquisition system 134), biometric data of the gameplay session (using biometric data acquisition system 136), and/or other types of data. The biometric data can be captured using various input devices, such as microphones, cameras, controllers, motion sensors, and other sensors configured to monitor outputs by the player.

The various systems of the data acquisition system 150 may be implemented by hardware, software or a combination. For example, the systems can be software plug-in to the game application 110, host application system 106, and/or application host systems 138. One or more of the systems can also be a standalone application which can communicate with the game application 110, host application system 106, and/or application host systems 138.

Digital Storyboard Generation Process

Figure 2:
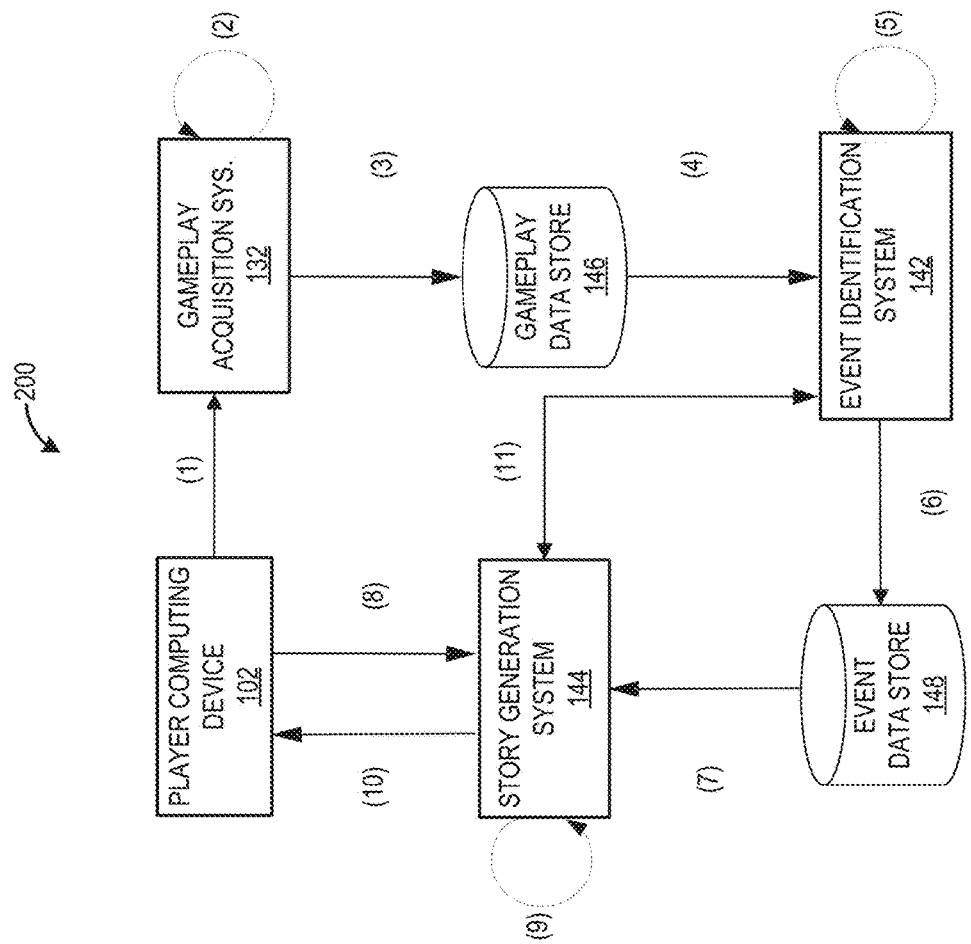
FIG. 2 presents a block diagram illustrating various interactions of a gameplay content generation system.

FIG. 2 illustrates an embodiment of interactions between the various components of the interactive computing system 130 and the user computing system 102 when acquiring data streams of a gameplay session and generating a storyboard.

At (1), during a gameplay session, the telemetry data acquisition system 134 and the biometric data acquisition system 136 can acquire biometric data streams and telemetry data streams, respectively. The telemetric data acquisition system 134 can record audio data and video data output by one or more input devices as one or more data streams. The telemetry data acquisition system 134 may gather data of the gameplay session such as, for example, moving visual images of the gameplay (for example, object's movements), audio data (for example, sound of bombing or shooting), system notifications, dialogues, interactions with items, messages among the players, player commentary, or the like. The telemetry data acquisition system 134 can be configured to record defined events that are triggered during the gameplay session. Telemetry data may include data specific to the game application such as, for example, character's movements, character's positions, character actions (for example, firing a gun, shooting a basketball, and the like), in-game event (for example, an enemy's death, the start of a play, a point being scored), player inputs (for example, buttons pressed), in-game camera position, character dialogue, and the like. The telemetry data may also define one or more segments within a game application. The telemetry data can be associated with the specific gameplay session by a session ID.

The gameplay session data can also include biometric data associated with the player, such as a input received from various input devices, such as microphones, cameras, controllers, motion sensors, and other sensors configured to monitor outputs by the player that are external to the telemetry data captured by the game application during the gameplay session.

At (2) the telemetry gameplay acquisition system 132 can process the received gameplay session data for storage. At (3) the gameplay session data can be stored within the gameplay data store. At (4), the gameplay session data can be provided to the event identification system for further analysis.

At (5) the event identification system can use the gameplay session data as inputs into one or more event identification models to identify interesting or noteworthy events that occurred during the gameplay session. The event identification models can analyze the data and identify events within the gameplay session. The event identification model may provide a rating associated with each of the events. For example, the event identification model may analyze each event within the gameplay session and provide a rating for that event, only events that satisfy a rating threshold are output for use by the storyboard generation system. The event identification model may only analyze a subset of the total events that occur during a gameplay session, for example, the event identification model may be configured to analyze events that are associated within a defined category or set of categories.

At (6), the identified events can then be stored in the event data store. The event data store may include a session ID associated with the telemetry data associated with the entire gameplay session, which could be stored in the telemetry data store. The data stored in the events data store may include a portion of the gameplay session data associated with each event. Gameplay session data associated with an event can refer to all data that occurs within a defined time frame of the event. During the event identification process, the events identified can be associated with a single point in time or may be associated with a range of time. The defined time frame can be a time period before and after a single time, the time range associated with the event, and/or the time frame associated with the event in addition to additional time before and or after the identified time frame. Additionally, different types of events may be associated with different time periods. In addition to the telemetry data, the biometric data associated with the same time period may also be included, such as audio or video of the player. Each identified event may have a start time and an end time. The event identification model may identify biometric data that is relevant to an identified event. For example, if a player was extremely excited after completing an event, the biometric data may include audio or video data that displays the user's excitement. The biometric data could be identified as being relevant for potentially inclusion with output of the event.

At (7), the event data can be provided to the storyboard generation system. The storyboard generation system can make the event data available to the player. At (8), the storyboard generation system may provide an interface that allows a player to request generation of a storyboard. Upon receiving instructions from the player to generate a story, the storyboard generation system can proceed with generation. Additionally, the storyboard generation system can provide an interface that allows for the player to provide input for generation of the storyboard. The user defined characteristics can provide a format that the storyboard generation system uses to generate the storyboard.

At (9), the storyboard generation system can generate the story based on the game application, storyboard generation system parameters, and/or user-defined parameters. The storyboard generation system can generate a complete storyboard or may generate an interface that allows the player to dynamically modify and customize the storyboard prior to completion. For example, the storyboard generation system can provide an editing interface for identified events within a gameplay session (such as illustrated in FIG. 3A). The player can have the option to select a subset of the selected events. The user can select the number of events, and how each event is going to be displayed within the storyboard.

Figure 4A:
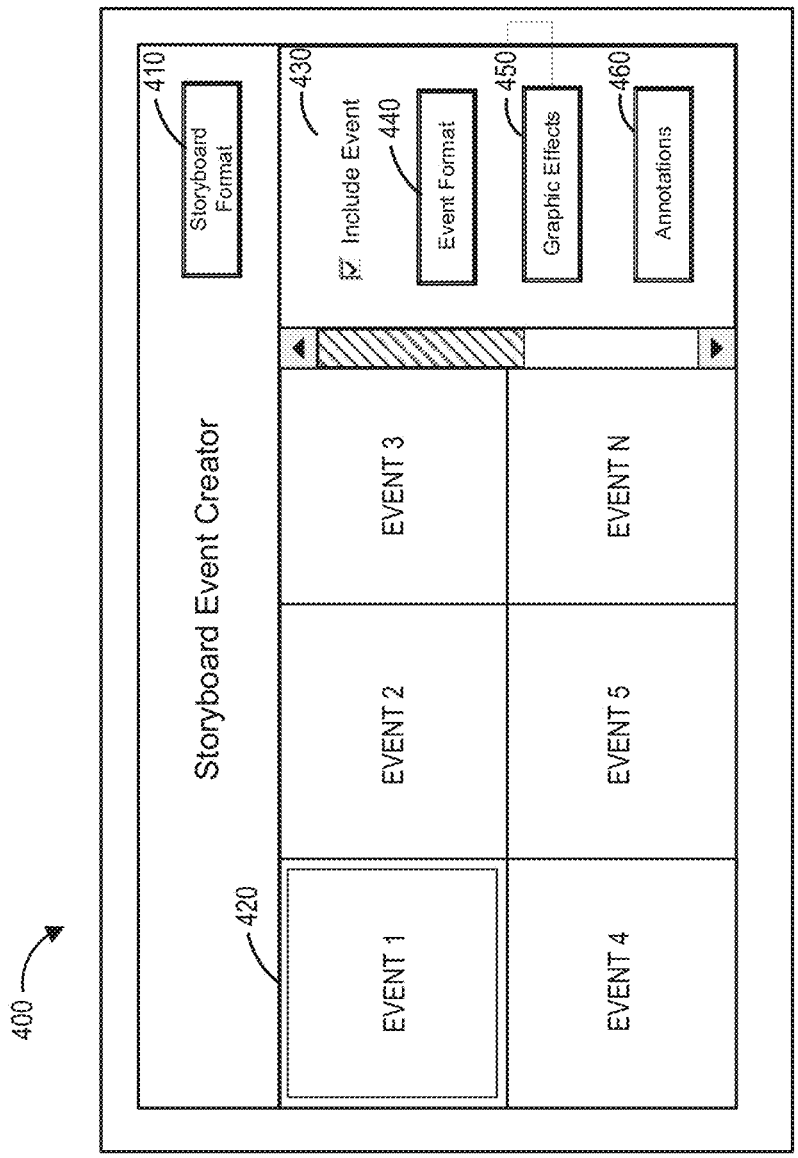
FIGS. 4A, 4B, and 4C illustrate embodiments of user interfaces for generation of a digital storyboard by a gameplay content generation system.
Figures 4B, 4C:
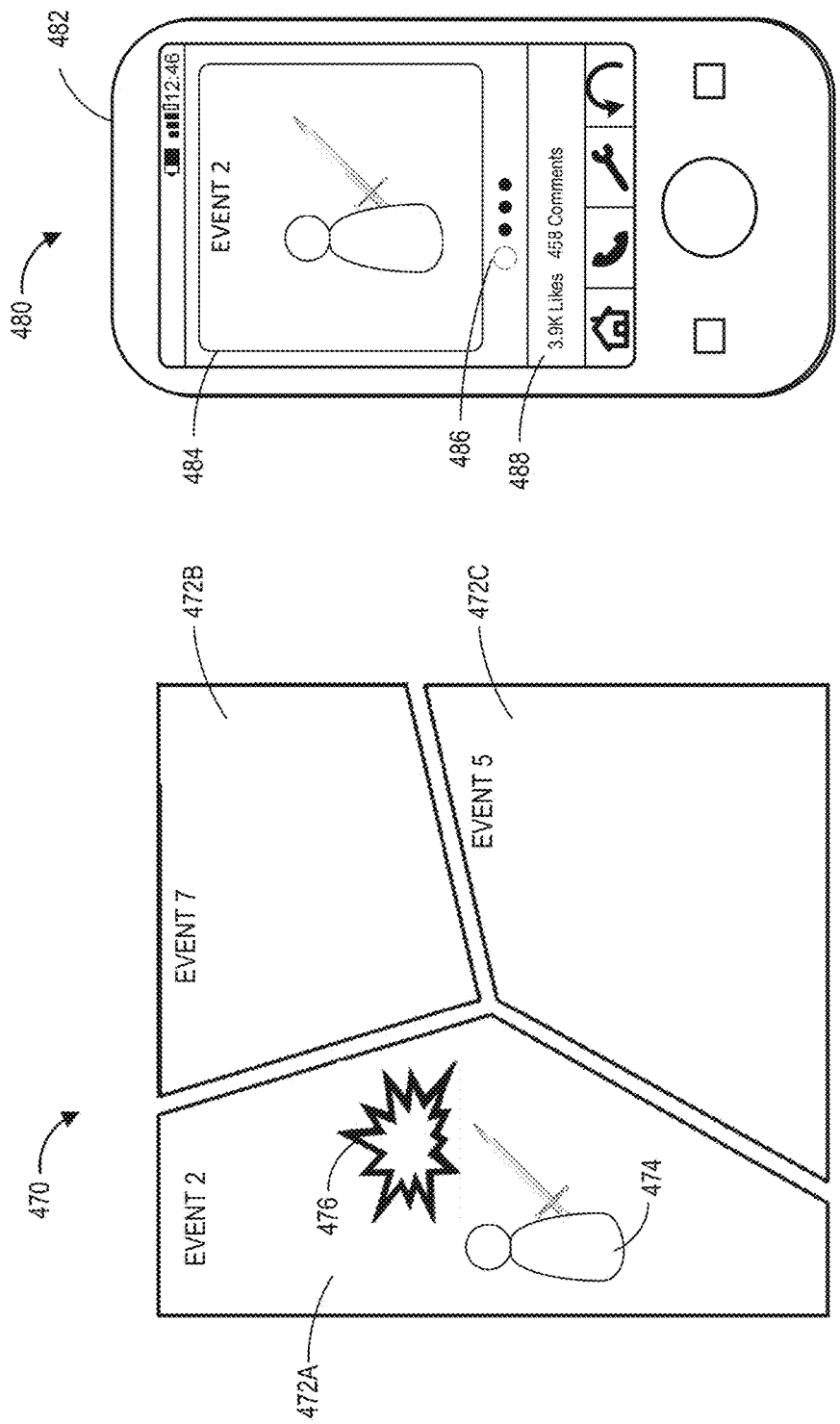

After the user finalizes the configuration of the storyboard, at (10), the storyboard generation system can generate and output a storyboard to the user (such as illustrated in FIGS. 4B and 4C). The storyboard generation system can provide multiple options for outputting and sharing the storyboard. The storyboard may be stored on the user account. In some embodiments, the storyboard may be modifiable after creation of the storyboard.

At (11), any input provided by the player can be provided to the event identification system and storyboard generation system as feedback for updating the any machine learning models. Additionally, the storyboard generation system can track how and where the storyboard has been output to generate additional feedback.

Event Identification Model System

Figure 3:
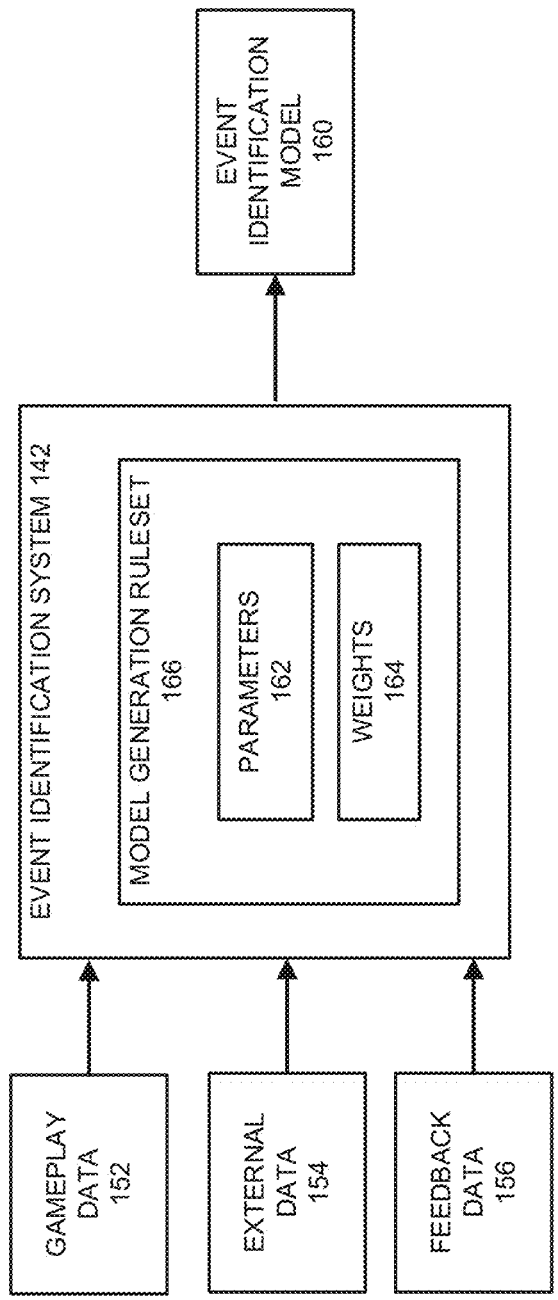
FIG. 3 presents a block diagram illustrating an embodiment of generating a event identification model.

FIG. 3 illustrates an embodiment of aspects of the event identification system 146. The event identification system 146 may be used to generate one or more event identification models 160 based on gameplay data 152, external data 154, and feedback data 156. As used herein, machine learning models include supervised or unsupervised machine learning techniques. Example machine learning models can include neural networks (e.g., convolutional neural networks or recurrent neural networks), or other deep learning techniques. The neural networks, for example recurrent neural networks, may utilize long short-term memory (LSTM) and/or gated recurrent units as storage. The use of machine models is one of many different methods or processes that can be used by the event identification system 146 to identify an event. In some embodiments, the event identification system 146 can use the gameplay data, external data, and feedback data to identify events using direct methods and/or heuristics. For example, the event identification system 146 can use direct information-value measures (for example, computing the relative entropy of the fragments of the stream and find spikes) to identify an event. Other methods, processes, and/or algorithms can also be used.

As used herein, gameplay data 152 includes information usable to train machine learning systems or models. Gameplay data may include telemetry data and biometric data generated during gameplay sessions. The telemetry data may include data specific to game applications such as, for example, character's movements, character's positions, character actions (for example, firing a gun, shooting a basketball, and the like), in-game event (for example, an enemy's death, the start of a play, a point being scored), player inputs (for example, buttons pressed), in-game camera position, character dialogue, and the like. The telemetry data may also define one or more segments within a game application. A segment can define a start time and an end time. A segment can include all events that trigger within the start time and the end time. For example, in a football game, the segments may include individual plays and quarters. The biometric data can include audio data, such as captured from a microphone, video data, sensor data from a controller, such as movement data, such as when the user is shaking or moving the controller. Optionally, the gameplay data may additionally include with label or annotation information describing the telemetry data and biometric data. The gameplay data may include data any number of gameplay sessions, which may include thousands of data points or more that can be used for training the model.

As used herein, external data 154 may include information usable by a machine learning model to identify relevant events within gameplay sessions. External data is obtained from sources external to a gameplay session, such as social media data. The external data can be based on information obtained from social media sites or streaming sites. These sites can be curated to identify information associated with game applications that may be interesting. For example, the sites can identify events that are trending, such as glitches, important achievements, challenges, types of events users enjoy watching, or other events occurring in video games that are garnering public approval or disapproval. These events may not be automatically detected or may not necessarily be apparent from gameplay session data as being events of significance. The external data can be acquired using various methods. The external data may not have corresponding telemetry data. The event identification system can use video analysis to extract event data from video and/or streaming data. For example, a player streaming a video game may be analyzed to identify the number of comments that are occurring during a particular segment of the video game, the number of subscribers, audio data and video data associated with the streamer, and other data associated with the stream. The video analysis can identify events that are occurring during the stream and correlate the identified events with the social media activity.

The event identification system 146 can also receive feedback data 156. The feedback data can refer to data received from the storyboard generation system during the storyboard generation process, social media feedback received from previously generated storyboards, and/or feedback data received from other sources. The feedback data 156 can be integrated using supervised and unsupervised model generation techniques.

The model generation system 146 may generally include a model generation rule set 170 for generation of the event identification model 160. The rule set 170 may include one or more parameters 162. Each set of parameters 162 may be combined using one or more mathematical functions to obtain a parameter function. Further, one or more specific parameters may be weighted by the weights 164. In some cases, the parameter function may be obtained by combining a set of parameters with a respective set of weights 164. The event identification model 160 and/or the respective parameters 162 of the prediction models 160 may be derived during a training process based on particular input data, such as the gameplay data 152, external data 154, and feedback data 156, and defined output criteria, which may be used for training purposes. The model generation rule set 166 can define the specific machine learning rules and/or algorithms the model generation system 146 uses to generate the model based on a defined objective function, such as identifying interesting events within a gameplay session. In some embodiments, initial parameters 162 and weights 164 can be manually provided during the initiation of the model generation process. The parameters 162 and weights 164 can be updated and modified during the model generation phase to generate the event identification model 160. In some embodiments, weights may be applied to the parameter functions or prediction models themselves. For example, the mathematical complexity or the number of parameters included in a particular event identification model 160 may affect a weight for the particular event identification model 160, which may impact the generation of the model and/or a selection algorithm or a selection probability that the particular event identification model 160 is selected.

The event identification system 146 can filter and categorize the data sets according to various characteristics and parameters of the data. For example, the data can be categorized by the data source (such as, for example, game application, microphone, camera, social media data), information type (such as, for example, gameplay events, audio data, video data), or other categories associated with the data. The event identification system 146 can filter the information to identify subsets of information for further processing. In some embodiments, the model generation system 146 is configured to filter and separate the gameplay data 152 into a plurality of data types or categories before further processing. After the event identification model 160 has been generated, the model can be used during runtime of the event identification system 146. The event identification model 160 can be used to identify relevant events that occur during a gameplay session.

The model generation system 146 can use one or more machine learning algorithms to generate one or more event identification models. The machine learning algorithms can be configured to adaptively develop and update the models over time based on new input received by the model generation system 146. For example, the models can be regenerated on a periodic basis as additional gameplay data, external data, and feedback data are received over time.

Some non-limiting examples of machine learning algorithms that can be used to generate and update the parameter functions or prediction models can include supervised and non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, Apriori algorithms), artificial neural network algorithms (such as, for example, Perceptron), deep learning algorithms (such as, for example, Deep Boltzmann Machine), dimensionality reduction algorithms (such as, for example, Principal Component Analysis), ensemble algorithms (such as, for example, Stacked Generalization), and/or other machine learning algorithms.

Example Embodiments of User Interfaces for Storyboard Generation

FIGS. 4A-4C depict various user interfaces for interfacing with the storyboard generation system on a user computing system 102. Each of the user interfaces shown includes one or more user interface controls that can be selected by a user, for example, using a browser or other application software. The user interface controls shown are merely illustrative examples and can be varied in other embodiments. For instance, buttons, dropdown boxes, select boxes, text boxes, check boxes, slider controls, and other user interface controls shown may be substituted with other types of user interface controls that provide the same or similar functionality. Further, user interface controls may be combined or divided into other sets of user interface controls such that similar functionality or the same functionality may be provided with very different looking user interfaces. Moreover, each of the user interface controls may be selected by a user using one or more input options, such as a mouse, touch screen input, or keyboard input, among other user interface input options.

FIG. 4A illustrates an example embodiment of a storyboard event creator user interface 400. The storyboard user interface 400 includes a storyboard forma 410 user control. The storyboard format user control can be used to select the format of generated storyboard. The storyboard format can determine the framework for the final output of the storyboard. The types of formats available may be determined based on the storyboard generation system and the game application. The formats may include a series of shorter videos highlighting the most important events, or a comic book style presentation. The various output formats may include a combination of video and still images. The storyboard may be part of a series of storyboards generated by the user, such as a series of gameplay session chapters. For example, in a long role-playing game the user may wish to chronicle the adventure and generate a comic book of the adventure after each gameplay session. Some example embodiments of output formats are illustrated in FIGS. 4B and 4C.

The storyboard user interface 400 can include an event selection portion 420, which can allow a user to interactively edit storyboard events. The event selection portion can be prepopulated by the events that have been previously identified by the event identification system and output to the storyboard generation system. The event prepopulation can place the events in chronological order, or prioritize the order based on defined criteria, such as by a rating associated with the importance of an event, the type of event, and/or other criteria. In some embodiments, the user may be able the reorder the display events using one or more filters (such as, for example, by event type, chronologically, alphabetically, and the like).

The user can determine whether each of the identified events are to be included within the storyboard (such as, by using control 430). The format of the storyboard may define a number of events that can be selected for insertion within the storyboard. Additionally, the user can customize the presentation of each event within the storyboard. For example, the user can select the event format 440, graphic effects 450, annotation 460, and/or other settings that can be used to customize and or modify the output of events within the storyboard.

The selection of the storyboard format 410 can influence the type and event customization options available to the user. The event format can determine in part how an event is going to be displayed within the storyboard. Each event can have certain display parameters that can be modified by the storyboard generation system and/or the player. The storyboard generation system may be configured to provide the event in its raw format, in other words, the format in which it was viewed by the player during the gameplay session. The raw format may be a video format or as one or more individual image (or frames). The raw format may not be as appealing or as engaging as seeing the event in another format. The storyboard generation system can utilize state data associated with the event to modify display characteristics of the event. In 3D games, multiple cameras may be available for viewing the event. The different cameras can be used to provide different perspectives of the same event. For example, in a first person shooter (FPS), the view is generally from the perspective of the player. During a replay of an event it can be more engaging to see the events from a different angle, such as from the perspective of an observer or an aerial view of the event. The storyboard generation system can provide various options that the user can select in order to recreate the event from a different angle or perspective that would be more engaging from the user to view. The storyboard generation system can be configured to automatically change the perspective of certain events.

The storyboard generation system can automatically change other aspects of an event, such as the length of an event segment. The event may have a defined timeframe. For example, an event may be a 1 minute video clip. The storyboard generation system can provide an editing interface for the user to alter the length of the video clip. In some instances the user may be able to increase the time of the clip. In some instances, the storyboard generation system may be configured to dynamically edit portions of event segments, such as capturing the most important parts of a segment. For example, an event segment may be automatically edited to only include the beginning and end of an encounter. The middle of the event may have been dull or not as engaging. In some instances, a video segment can be converted to a series of still images. For example, the video segment may show only the portions of an event segment that are most interesting. For example, in a long fight, the entire fight may not be engaging, but the storyboard generation system may splice together a series of frames of each or a subset of the hits on the boss and the killing blow into a time-lapse type video of the event, rather than displaying the entire fight sequence. A user may wish to create a story board of the events that are all still images of the video game session, similar to a comic book. In some instances, the user may wish to include audio and or video of the user during the occurrence of the event, such as a picture-in-picture display of the player as the event is occurring. The storyboard generation system can be configured to overlay or position the player video and/or audio with the event segment video.

The storyboard generation system may have a control, such as graphics effects 450, which can be configured to post process the graphics within the game to give them a different appearance. For example the graphics can be post processed to provide a different style of art, such as reducing the resolution of the textures and adding thicker lines at the edges of entities within a frame, and/or other types of stylistic effects or modifications to the frames within a video or image. These effects can be applied using filters or other post processing effects.

The storyboard generation system may have a control, such as annotations 460, which can be configured to add annotations to the videos and/or images to event segments. The annotations may be added automatically based on the type of events. For example, during an explosion within in the game, the resulting images can have automated annotations associated with the type of event, such as "BOOM!". Alternatively, the user could be provided with annotations that could be added manually.

In some embodiments, the interface may have a search interface that allows the user to access additional events that were not selected by the event identification system. For example, the user may be able to search events within a gameplay session based on event type. The user can then filter events from any type and include those events. Alternatively, or additionally, storyboard generation system can be configured to provide access to the entire gameplay session video.

After the user finalizes the configuration of the storyboard, the storyboard generation system can generate and output a storyboard to the user (such as illustrated in FIGS. 4B and 4C). The storyboard generation system can provide multiple options for outputting and sharing the storyboard. The storyboard may be stored on the user account. In some embodiments, the storyboard may be modifiable after creation of the storyboard.

FIGS. 4B and 4C illustrate example embodiments of storyboard formats. FIG. 4B illustrates an example of a comic book style frame layout 470. The layout 470 includes a plurality of frames 472A-473C (with the frames generally referred to as 472). Each frame 472 is associated with a different event. Frame 472A illustrates an example of the event output 474 and may be configured to display and an annotation 476. The event output may be an embedded video format, such as GIF format, or a still image. The events displayed in each frame 472 can have different output characteristics. For example 472A can have a video output, while 472B-C can be still images. The output 470 can be representative of one page of a series of pages associated with the gameplay session.

FIG. 4C illustrates another embodiment of a storyboard format 480. The output 480 can be configured for display on a social media platform, such as on a mobile device 482. The storyboard format 480 can be output in such a way that it can be automatically output to the social media platform, or other platform of the user's choice. The event 484 can be displayed in a series of segments 486, in which the user can scroll or swipe through event segments. Each event segment can be a video or image format. The platform may have social media information 488 that can provide feedback information associated with the storyboard output. In some embodiments, the storyboard output can be created as a video that combines all of the event segments into the single video file. The storyboard generation system may be configured to insert transitions or other visual effects between segments. FIGS. 4B and 4C are illustrative examples of some of the available outputs and are not meant to be limiting. The storyboard generation system can be configured to generate the in many different formats not illustrated herein but in accordance with the teachings of the present disclosure.

Flowchart for Embodiment of a Process of Storyboard Generation

Figure 5:
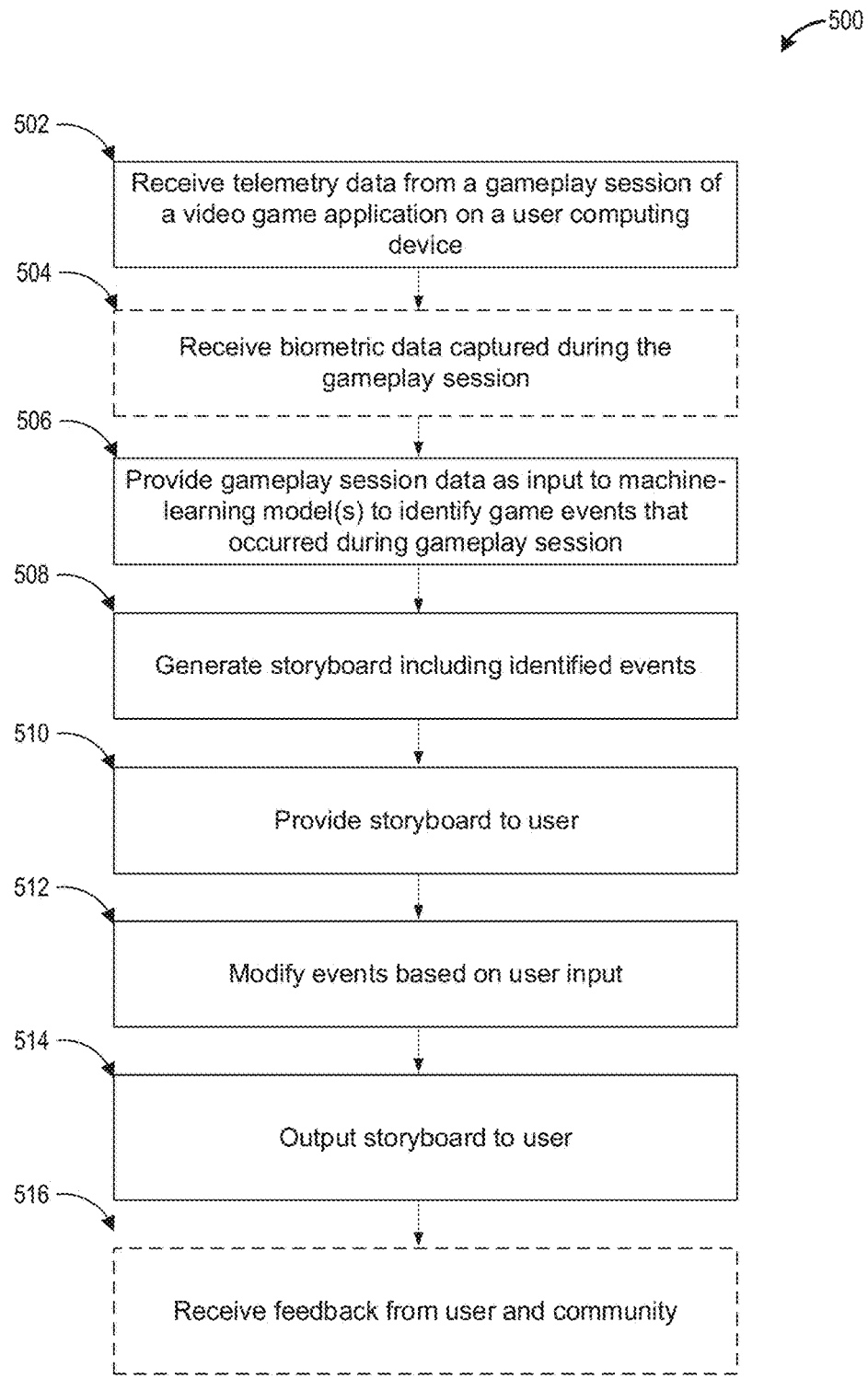
FIG. 5 illustrates a flowchart of an embodiment of a digital storyboard generation process.

FIG. 5 illustrates an embodiment of a flowchart for a process 500 for generating and outputting a storyboard. The process 500, in whole or in part, can be implemented by an interactive computing system 130, a gameplay acquisition system 132, a gameplay output generation system 140, or other computing system. Although any number of systems, in whole or in part, can implement the process 500, to simplify discussion, the process 500 will be described with respect to the interactive computing system 130.

At block 502, during a gameplay session initiated on the user computing device, the interactive computing system 130 receives telemetry data from the gameplay session on the user computing device. The telemetry data may include data of the gameplay session such as, for example, moving visual images of the gameplay (for example, object's movements), audio data (for example, sound of bombing or shooting), system notifications, dialogues, interactions with items, messages among the players, player commentary, or the like. The telemetry data can be a record of defined events that are triggered during the gameplay session. Telemetry data may also include data specific to the game application such as, for example, character's movements, character's positions, character actions (for example, firing a gun, shooting a basketball, and the like), in-game event (for example, an enemy's death, the start of a play, a point being scored), player inputs (for example, buttons pressed), in-game camera position, character dialogue, and the like. The telemetry data may also define one or more segments within a game application. The telemetry data can be associated with the specific gameplay session by a session ID.

At block 504, during a gameplay session initiated on the user computing device, the interactive computing system 130 may receive, if available, biometric data from the gameplay session on the user computing device. The biometric data may include audio data and video data output by one or more input devices as one or more data streams from the user computing device and associated with the user playing the game application (and possibly additional users in the vicinity of the user computing system), such as a input received from various input devices, such as microphones, cameras, controllers, motion sensors, and other sensors configured to monitor outputs by the player that are external to the telemetry data captured by the game application during the gameplay session.

At block 506, the telemetry gameplay acquisition system 132 can process the received gameplay session data and provide the gameplay session data as input to one or more event identification models to identify game events within the gameplay session. The gameplay session data can refer to collectively, to all data generated during the gameplay session, which can include telemetry data and biometric data. The event identification model can use the gameplay session data as inputs into one or more event identification models to identify interesting or noteworthy events that occurred during the gameplay session. Event identification models can analyze the data and identify events within the gameplay session. The event identification model may provide a rating associated with each of the events. For example, the event identification model may analyze each event within the gameplay session and provide a rating for that event, only events that satisfy a rating threshold are output for use by the storyboard generation system. The event identification model may only analyze a subset of the total events that occur during a gameplay session, for example, the event identification model may be configured to analyze events that are associated within a defined category or set of categories. During the event identification process, the events identified can be associated with a single point in time or may be associated with a range of time. The defined time frame can be a time period before and after a single time, the time range associated with the event, and/or the time frame associated with the event in addition to additional time before and or after the identified time frame. Additionally, different types of events may be associated with different time periods. In addition to the telemetry data, the biometric data associated with the same time period may also be included, such as audio or video of the player. Each identified event may have a start time and an end time. The event identification model may identify biometric data that is relevant to an identified event. For example, if a player was extremely excited after completing an event, the biometric data may include audio or video data that displays the user's excitement. The biometric data could be identified as being relevant for potentially inclusion with output of the event.

At block 508, the identified events can be generated for the storyboard. The events can be stored in a data store and may include a session ID associated with the telemetry data associated with the entire gameplay session, which could be stored in the telemetry data store. The data stored in the events data store may include a portion of the gameplay session data associated with each event. Gameplay session data associated with an event can refer to all data that occurs within a defined time frame of the event.

At block 510, the identified events and storyboard can be made available to the player. The interactive computing system 130 can generate the story based on the game application, storyboard generation system parameters, and/or user-defined parameters. The interactive computing system 130 may provide an interface that allows a player to access the storyboard. The interface can allow for the player to provide input for generation of the storyboard. The user can provide characteristics can provide a format that the interactive computing system 130 uses to generate the storyboard. The storyboard generation system can generate a complete storyboard or may generate an interface that allows the player to dynamically modify and customize the storyboard prior to completion.

At block 512, the interactive computing system 130 can modify the storyboard based on input received from the user. For example, the storyboard generation system can provide an editing interface for identified events within a gameplay session. The player can have the option to select a subset of the selected events. The user can select the number of events, and how each event is going to be displayed within the storyboard.

At block 514, after the user finalizes the configuration of the storyboard, the interactive computing system can generate and output a storyboard to the user (such as illustrated in FIGS. 4B and 4C). The storyboard generation system can provide multiple options for outputting and sharing the storyboard. The storyboard may be stored on the user account. In some embodiments, the storyboard may be modifiable after creation of the storyboard.

At block 516, any input provided by the player can be provided to the event identification system and storyboard generation system as feedback for updating the any machine learning models. Additionally, the storyboard generation system can track how and where the storyboard has been output to generate additional feedback data that can be used to update the event identification models.

Overview of Computing Device

Figure 6:
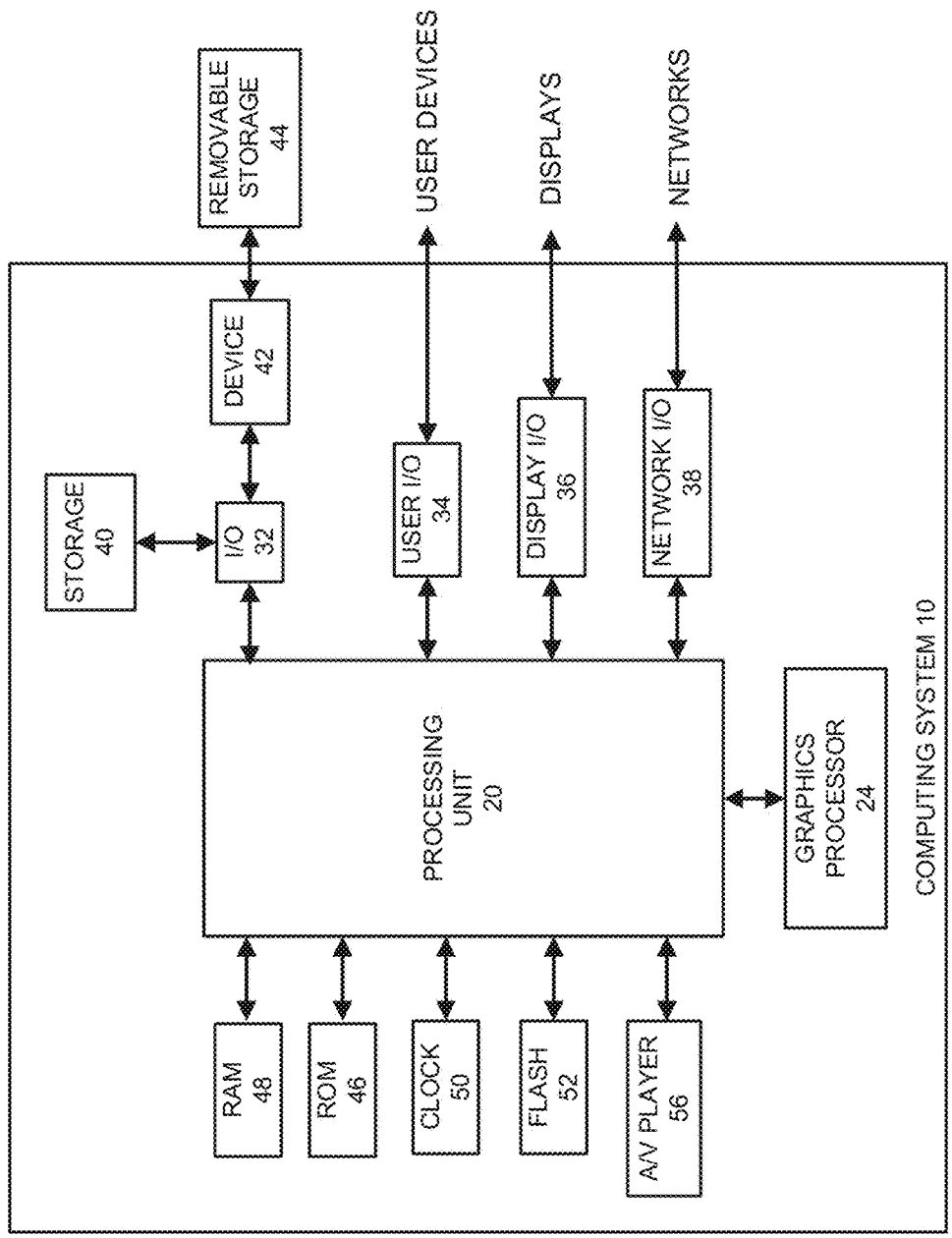
FIG. 6 illustrates an embodiment of a computing device.

FIG. 6 illustrates an embodiment of computing device 10 according to the present disclosure. Other variations of the computing device 10 may be substituted for the examples explicitly presented herein, such as removing or adding components to the computing device 100. The computing device 10 may include a game device, a smart phone, a tablet, a personal computer, a laptop, a smart television, a car console display, a server, and the like. As shown, the computing device 10 includes a processing unit 20 that interacts with other components of the computing device 10 and also external components to computing device 10. A media reader 22 is included that communicates with media 12. The media reader 22 may be an optical disc reader capable of reading optical discs, such as CD-ROM or DVDs, or any other type of reader that can receive and read data from game media 12. One or more of the computing devices may be used to implement one or more of the systems disclosed herein.

Computing device 10 may include a separate graphics processor 24. In some cases, the graphics processor 24 may be built into the processing unit 20. In some such cases, the graphics processor 24 may share Random Access Memory (RAM) with the processing unit 20. Alternatively, or in addition, the computing device 10 may include a discrete graphics processor 24 that is separate from the processing unit 20. In some such cases, the graphics processor 24 may have separate RAM from the processing unit 20. Computing device 10 might be a handheld video game device, a dedicated game console computing system, a general-purpose laptop or desktop computer, a smart phone, a tablet, a car console, or other suitable system.

Computing device 10 also includes various components for enabling input/output, such as an I/O 32, a user I/O 34, a display I/O 36, and a network I/O 38. I/O 32 interacts with storage element 40 and, through a device 42, removable storage media 44 in order to provide storage for computing device 10. Processing unit 20 can communicate through I/O 32 to store data, such as game state data and any shared data files. In addition to storage 40 and removable storage media 44, computing device 10 is also shown including ROM (Read-Only Memory) 46 and RAM 48. RAM 48 may be used for data that is accessed frequently, such as when a game is being played or the fraud detection is performed.

User I/O 34 is used to send and receive commands between processing unit 20 and user devices, such as game controllers. In some embodiments, the user I/O can include a touchscreen inputs. The touchscreen can be capacitive touchscreen, a resistive touchscreen, or other type of touchscreen technology that is configured to receive user input through tactile inputs from the user. Display I/O 36 provides input/output functions that are used to display images from the game being played. Network I/O 38 is used for input/output functions for a network. Network I/O 38 may be used during execution of a game, such as when a game is being played online or being accessed online and/or application of fraud detection, and/or generation of a fraud detection model.

Display output signals produced by display I/O 36 comprising signals for displaying visual content produced by computing device 10 on a display device, such as graphics, user interfaces, video, and/or other visual content. Computing device 10 may comprise one or more integrated displays configured to receive display output signals produced by display I/O 36. According to some embodiments, display output signals produced by display I/O 36 may also be output to one or more display devices external to computing device 10, such a display 16.

The computing device 10 can also include other features that may be used with a game, such as a clock 50, flash memory 52, and other components. An audio/video player 56 might also be used to play a video sequence, such as a movie. It should be understood that other components may be provided in computing device 10 and that a person skilled in the art will appreciate other variations of computing device 10.

Program code can be stored in ROM 46, RAM 48 or storage 40 (which might comprise hard disk, other magnetic storage, optical storage, other non-volatile storage or a combination or variation of these). Part of the program code can be stored in ROM that is programmable (ROM, PROM, EPROM, EEPROM, and so forth), part of the program code can be stored in storage 40, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM is used and holds data that is generated during the execution of an application and portions thereof might also be reserved for frame buffers, application state information, and/or other data needed or usable for interpreting user input and generating display outputs. Generally, RAM 48 is volatile storage and data stored within RAM 48 may be lost when the computing device 10 is turned off or loses power.

As computing device 10 reads media 12 and provides an application, information may be read from game media 12 and stored in a memory device, such as RAM 48. Additionally, data from storage 40, ROM 46, servers accessed via a network (not shown), or removable storage media 46 may be read and loaded into RAM 48. Although data is described as being found in RAM 48, it will be understood that data does not have to be stored in RAM 48 and may be stored in other memory accessible to processing unit 20 or distributed among several media, such as media 12 and storage 40.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

The invention claimed is:

1. A computer-implemented method comprising:
under control of one or more hardware computing devices configured with specific computer-executable instructions, the specific computer-executable instructions stored in an electronic hardware memory,
receiving, over a network from a user computing system, gameplay session data from a gameplay session of a video game application on the user computing system, the gameplay session data including a plurality of events occurring during the gameplay session, wherein during the gameplay session a virtual entity within the video game application is controlled by a user via the user computing system, wherein the gameplay session data includes at least one of biometric video data or biometric audio data of the user captured during the gameplay session by one or more input devices associated with the user computing system;
identifying a subset of events of the plurality of events, wherein the subset of events is automatically identified by an event identification model based at least in part on an analysis of at least a portion of the gameplay session data, wherein at least the portion of the gameplay session data includes at least a portion of biometric video data or biometric audio data, wherein the event identification model is a machine learning model and at least the portion of the gameplay session data is used as input for the event identification model;

generating a first digital storyboard including the subset of events; and outputting the first digital storyboard to the user.

2. The computer-implemented method of claim 1, wherein the gameplay session data includes telemetry data from the gameplay session.

3. The computer-implemented method of claim 2, wherein the telemetry data includes video data and audio data of the gameplay session.

4. The computer-implemented method of claim 3, wherein the at least on one of the biometric video data or the biometric audio data is synchronized in time with the telemetry data.

5. The computer-implemented method of claim 4, wherein the first digital storyboard includes, for at least one event, the video data associated with the event in conjunction with at least one of the biometric video data or the biometric audio data associated with the event.

6. The computer-implemented method of claim 1, wherein identifying a subset of events further comprises providing a rating for each event and identifying the subset of events based at least in part on the rating.

7. The computer-implemented method of claim 1 further comprising:

outputting instructions to provide the first digital storyboard to a user within a storyboard editing interface;

receiving input, from the user, indicating modifications to one or more events of the subset of events;

modifying the one or more events based on the input resulting in one or more modified events; and modifying the first digital storyboard to include at least the one or more modified events.

8. The computer-implemented method of claim 7, wherein each event is associated with at least a portion of video data, wherein the portion of the video data associated with the event if from a first point of view captured within a game environment during the gameplay session, wherein the modifying the one or more events comprises generating video data for the event from a second point of view within the game environment and outputting the video data from the second point of view.

9. The computer-implemented method of claim 7, the modifying the one or more events comprises automatically adding annotations to the events based at least in part on a type of event.

10. A system comprising:

an electronic data store configured to store an event identification model;

at least one hardware processor in communication with the electronic data store, the hardware processor configured to execute specific computer-executable instructions to at least:

receive, over a network from a user computing system, gameplay session data from a gameplay session of a video game application on the user computing system, the gameplay session data including a plurality of events occurring during the gameplay session, wherein during the gameplay session a virtual entity within the video game application is controlled by a user via the user computing system, wherein the gameplay session data includes at least one of biometric video data or biometric audio data of the user captured during the gameplay session by one or more input devices associated with the user computing system;

identify a subset of events of the plurality of events, wherein the subset of events is automatically identified by an event identification model based at least in part on an analysis of at least a portion of the gameplay session data, wherein at least the portion of the gameplay session data includes at least a portion of biometric video data or biometric audio data, wherein the event identification model is a machine learning model and at least the portion of the gameplay session data is used as input for the event identification model;

generate a first digital storyboard including the subset of events; and output the first digital storyboard to the user.

11. The system of claim 10, wherein the gameplay session data includes telemetry data from the gameplay session.

12. The system of claim 11, wherein the telemetry data includes video data and audio data of the gameplay session.

13. The system of claim 12, wherein the at least one of the biometric video data or the biometric audio data is synchronized in time with the telemetry data.

14. The system of claim 13, wherein the first digital storyboard includes, for at least one event, the video data associated with the event in conjunction with at least one of the biometric video data or the biometric audio data associated with the event.

15. The system of claim 13, wherein each event is associated with at least a portion of the video data, wherein the portion of the video data associated with the event if from a first point of view captured within a game environment during the gameplay session, wherein the at least one hardware processor is further configured to generate video data for the event from a second point of view within the game environment and output the video data from the second point of view.

16. The system of claim 10, wherein the at least one hardware processor is further configured to provide a rating for each event and identifying the subset of events based at least in part on the rating.

17. A non-transitory computer-readable storage medium storing computer executable instructions that, when executed by one or more computing devices, configure the one or more computing devices to perform operations comprising:

under control of one or more hardware computing devices configured with specific computer-executable instructions, the specific computer-executable instructions stored in an electronic hardware memory, receiving, over a network from a user computing system, gameplay session data from a gameplay session of a video game application on the user computing system, the gameplay session data including a plurality of events occurring during the gameplay session, wherein during the gameplay session a virtual entity within the video game application is controlled by a user via the user computing system, wherein the gameplay session data includes at least one of biometric video data or biometric audio data of the user captured during the gameplay session by one or more input devices associated with the user computing system;

identifying a subset of events of the plurality of events, wherein the subset of events is automatically identified by an event identification model based at least in part on an analysis of at least a portion of the gameplay session data, wherein at least the portion of the gameplay session data includes at least a portion of biometric video data or biometric audio data, wherein the event identification model is a machine learning model and at least the portion of the gameplay session data is used as input for the event identification model;

generating a first digital storyboard including the subset of events; and outputting the first digital storyboard to the user.

18. The non-transitory computer-readable storage medium of claim 17, wherein the gameplay session data includes telemetry data from the gameplay session.

19. The non-transitory computer-readable storage medium of claim 18, wherein the telemetry data includes video data and audio data of the gameplay session.

20. The non-transitory computer-readable storage medium of claim 19, wherein the at least one of the biometric video data or the biometric audio data is synchronized in time with the telemetry data.

* * * * *